(12) United States Patent
Bergin et al.

(10) Patent No.: US 7,264,560 B2
(45) Date of Patent: Sep. 4, 2007

(54) GOLF BALL

(75) Inventors: Thomas F. Bergin, Hoyoke, MA (US); Daniel Murphy, Chicopee, MA (US); Vincent J. Simonds, Brimfield, MA (US); Thomas A. Veilleux, Charlton, MA (US)

(73) Assignee: Callaway Golf Company, Carlsbad, CA (US)

( * ) Notice: Subject to any disclaimer, the term of this patent is extended or adjusted under 35 U.S.C. 154(b) by 206 days.

(21) Appl. No.: 10/906,879

(22) Filed: Mar. 10, 2005

(65) Prior Publication Data

US 2006/0205536 A1    Sep. 14, 2006

(51) Int. Cl.
*A63B 37/12* (2006.01)

(52) U.S. Cl. ...................................... 473/378

(58) Field of Classification Search ................ 473/373, 473/374, 377, 378
See application file for complete search history.

(56) References Cited

U.S. PATENT DOCUMENTS

| | | |
|---|---|---|
| 2,741,480 A | 4/1956 | Smith |
| 2,973,800 A | 3/1961 | Muccino |
| 3,053,539 A | 9/1962 | Picchowski |
| 3,264,272 A | 8/1966 | Rees |
| 3,313,545 A | 4/1967 | Bartsch |
| 3,373,123 A | 3/1968 | Brice |
| 3,384,612 A | 5/1968 | Brandt et al. |
| 3,395,109 A | 7/1968 | Molitor et al. |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |
| 3,979,126 A | 9/1976 | Dusbiber |
| 3,989,568 A | 11/1976 | Isaac |
| 4,076,255 A | 2/1978 | Moore et al. |
| 4,085,937 A | 4/1978 | Schenk |
| 4,123,061 A | 10/1978 | Dusbiber |
| 4,190,711 A | 2/1980 | Zdrahala et al. |
| 4,218,543 A | 8/1980 | Weber et al. |
| 4,248,432 A | 2/1981 | Hewitt et al. |
| 4,272,079 A | 6/1981 | Nakade et al. |
| 4,274,637 A | 6/1981 | Molitor |
| 4,337,946 A | 7/1982 | Saito et al. |
| 4,431,193 A | 2/1984 | Nesbitt |
| 4,442,282 A | 4/1984 | Kolycheck |
| 4,570,937 A | 2/1986 | Yamada |
| 4,582,887 A | 4/1986 | Dominguez et al. |
| 4,590,219 A | 5/1986 | Nissen et al. |
| 4,607,090 A | 8/1986 | Dominguez |
| 4,650,193 A | 3/1987 | Molitor et al. |
| 4,674,751 A | 6/1987 | Molitor et al. |
| 4,679,795 A | 7/1987 | Melvin et al. |

(Continued)

*Primary Examiner*—Raeann Trimiew
(74) *Attorney, Agent, or Firm*—Michael A. Catania; Elaine H. Lo

(57) ABSTRACT

Pinless molding of a cover (24) for a golf ball (20), and an apparatus and method for manufacturing a golf ball precursor product (22) for use in pinless molding is disclosed herein. Preferably the golf ball precursor product (22) comprises a core (26) and a mantle layer (28). The golf ball precursor product (22) preferably has a plurality of lobes (30) extending from an innersphere (27). The plurality of lobes (30) allow the golf ball precursor product (22) to be centered within a cover mold without the use of pins for centering.

19 Claims, 8 Drawing Sheets

U.S. PATENT DOCUMENTS

| | | |
|---|---|---|
| 4,688,801 A | 8/1987 | Reiter |
| 4,690,981 A | 9/1987 | Slatz |
| 4,695,055 A | 9/1987 | Newcomb et al. |
| 4,714,253 A | 12/1987 | Nakahara et al. |
| 4,762,322 A | 8/1988 | Molitor et al. |
| 4,798,386 A | 1/1989 | Berard |
| 4,848,770 A | 7/1989 | Shama |
| 4,852,884 A | 8/1989 | Sullivan |
| 4,858,923 A | 8/1989 | Gobush et al. |
| 4,858,924 A | 8/1989 | Saito et al. |
| 4,878,674 A | 11/1989 | Newcomb et al. |
| 4,884,814 A | 12/1989 | Sullivan |
| 4,911,451 A | 3/1990 | Sullivan et al. |
| 4,919,434 A | 4/1990 | Saito |
| 4,957,297 A | 9/1990 | Newcomb et al. |
| 4,979,746 A | 12/1990 | Gentiluomo |
| 4,984,804 A | 1/1991 | Yamada et al. |
| 4,986,545 A | 1/1991 | Sullivan |
| 5,002,281 A | 3/1991 | Nakahara et al. |
| 5,006,297 A | 4/1991 | Brown et al. |
| 5,019,319 A | 5/1991 | Nakamura et al. |
| 5,026,067 A | 6/1991 | Gentiluomo |
| 5,035,425 A | 7/1991 | Edwards |
| 5,045,591 A | 9/1991 | Meyer et al. |
| 5,048,838 A | 9/1991 | Chikaraishi et al. |
| 5,068,151 A | 11/1991 | Nakamura |
| 5,072,944 A | 12/1991 | Nakahara et al. |
| 5,096,201 A | 3/1992 | Egashira et al. |
| 5,098,105 A | 3/1992 | Sullivan |
| 5,104,126 A | 4/1992 | Gentiluomo |
| 5,120,791 A | 6/1992 | Sullivan |
| 5,142,835 A | 9/1992 | Mrocca |
| 5,150,906 A | 9/1992 | Molitor et al. |
| 5,156,405 A | 10/1992 | Kitaoh et al. |
| 5,184,828 A | 2/1993 | Kim et al. |
| 5,187,013 A | 2/1993 | Sullivan |
| 5,197,740 A | 3/1993 | Pocklington et al. |
| 5,219,973 A | 6/1993 | Slack et al. |
| 5,222,739 A | 6/1993 | Horiuchi et al. |
| 5,244,969 A | 9/1993 | Yamada |
| 5,253,871 A | 10/1993 | Viollaz |
| 5,273,286 A | 12/1993 | Sun |
| 5,273,287 A | 12/1993 | Molitor et al. |
| 5,274,041 A | 12/1993 | Yamada |
| 5,281,651 A | 1/1994 | Arjunan et al. |
| 5,300,334 A | 4/1994 | Niederst et al. |
| 5,304,608 A | 4/1994 | Yabuki et al. |
| 5,306,760 A | 4/1994 | Sullivan |
| 5,312,857 A | 5/1994 | Sullivan |
| 5,314,187 A | 5/1994 | Proudfit |
| 5,324,783 A | 6/1994 | Sullivan |
| 5,330,837 A | 7/1994 | Sullivan |
| 5,334,673 A | 8/1994 | Wu |
| 5,338,610 A | 8/1994 | Sullivan |
| 5,368,304 A | 11/1994 | Sullivan et al. |
| 5,368,806 A | 11/1994 | Harasin et al. |
| 5,387,750 A | 2/1995 | Chiang |
| 5,403,010 A | 4/1995 | Yabuki et al. |
| 5,439,227 A | 8/1995 | Egashira et al. |
| 5,480,155 A | 1/1996 | Molitor et al. |
| 5,482,285 A | 1/1996 | Yabuki et al. |
| 5,484,870 A | 1/1996 | Wu |
| 5,490,673 A | 2/1996 | Hiraoka |
| 5,490,674 A | 2/1996 | Hamada et al. |
| 5,492,972 A | 2/1996 | Stefani |
| 5,553,852 A | 9/1996 | Higuchi et al. |
| 5,586,950 A | 12/1996 | Endo |
| 5,628,699 A | 5/1997 | Maruko et al. |
| 5,668,239 A | 9/1997 | Nodelman et al. |
| 5,674,137 A | 10/1997 | Maruko et al. |
| 5,688,191 A | 11/1997 | Cavallaro et al. |
| 5,692,974 A | 12/1997 | Wu et al. |
| 5,730,665 A | 3/1998 | Shimosaka et al. |
| 5,733,206 A | 3/1998 | Nesbitt et al. |
| 5,733,207 A | 3/1998 | Sullivan et al. |
| 5,733,428 A | 3/1998 | Calabria et al. |
| 5,739,247 A | 4/1998 | Lesko et al. |
| 5,739,253 A | 4/1998 | Nodelman et al. |
| 5,750,580 A | 5/1998 | Mayer et al. |
| 5,759,676 A | 6/1998 | Cavallaro et al. |
| 5,779,561 A | 7/1998 | Sullivan et al. |
| 5,779,562 A | 7/1998 | Melvin et al. |
| 5,779,563 A | 7/1998 | Yamagishi et al. |
| 5,783,293 A | 7/1998 | Lammi |
| 5,792,008 A | 8/1998 | Kakiuchi et al. |
| 5,797,808 A | 8/1998 | Hayashi et al. |
| 5,800,284 A | 9/1998 | Sullivan et al. |
| 5,803,831 A | 9/1998 | Sullivan et al. |
| 5,810,678 A | 9/1998 | Cavallaro et al. |
| 5,813,923 A | 9/1998 | Cavallaro et al. |
| 5,816,937 A | 10/1998 | Shimosaka et al. |
| 5,820,488 A | 10/1998 | Sullivan et al. |
| 5,820,489 A | 10/1998 | Sullivan et al. |
| 5,820,491 A | 10/1998 | Hatch et al. |
| 5,827,167 A | 10/1998 | Dougan et al. |
| 5,830,087 A | 11/1998 | Sullivan et al. |
| 5,833,553 A | 11/1998 | Sullivan et al. |
| 5,833,554 A | 11/1998 | Sullivan et al. |
| 5,836,833 A | 11/1998 | Shimosaka et al. |
| 5,849,168 A | 12/1998 | Lutz |
| 5,856,388 A | 1/1999 | Harris et al. |
| 5,863,264 A | 1/1999 | Yamagishi et al. |
| 5,873,796 A | 2/1999 | Cavallaro et al. |
| 5,885,172 A | 3/1999 | Hebert et al. |
| 5,888,437 A | 3/1999 | Calabria et al. |
| 5,891,973 A | 4/1999 | Sullivan et al. |
| 5,897,884 A | 4/1999 | Calabria et al. |
| 5,899,822 A | 5/1999 | Yamagishi et al. |
| 5,902,192 A | 5/1999 | Kashiwagi et al. |
| 5,908,358 A | 6/1999 | Wu |
| 5,919,100 A | 7/1999 | Boehm et al. |
| 5,919,862 A | 7/1999 | Rajagopalan et al. |
| 5,922,252 A | 7/1999 | Stanton et al. |
| 5,929,189 A | 7/1999 | Ichikawa et al. |
| 5,935,021 A | 8/1999 | Kashiwagi et al. |
| 5,947,842 A | 9/1999 | Cavallaro et al. |
| 5,947,843 A | 9/1999 | Calabria et al. |
| 5,959,059 A | 9/1999 | Vedula et al. |
| 5,976,035 A | 11/1999 | Umezawa et al. |
| 5,984,807 A | 11/1999 | Wai et al. |
| 6,595,874 B2 * | 7/2003 | Sullivan et al. .............. 473/374 |
| 2001/0027140 A1 * | 10/2001 | Bellinger et al. ........... 473/356 |

* cited by examiner

GOLF BALL

BACKGROUND OF THE INVENTION

1. Field of the Invention

The present invention relates to a golf ball. More specifically, the present invention relates to a golf ball, a method of forming a golf ball, and an apparatus and method for forming a golf ball precursor product.

2. Description of the Related Art

Golf balls are typically made by molding a core of elastomeric or polymeric material into a spheroid shape. A cover is then molded around the core. Sometimes, before the cover is molded about the core, an intermediate layer is molded about the core and the cover is then molded around the intermediate layer. The molding processes used for the cover and the intermediate layer are similar and usually involve either compression molding or injection molding.

In compression molding, the golf ball core is inserted into a central area of a two piece die and pre-sized sections of cover material are placed in each half of the die, which then clamps shut. The application of heat and pressure molds the cover material about the core.

Blends of polymeric materials have been used for modern golf ball covers because certain grades and combinations have offered certain levels of hardness to resist damage when the ball is hit with a club and elasticity to allow responsiveness to the hit. Some of these materials facilitate processing by compression molding, yet disadvantages have arisen. These disadvantages include the presence of seams in the cover, which occur where the pre-sized sections of cover material were joined, and long process cycle times which are required to heat the cover material and complete the molding process.

Injection molding of golf ball covers arose as a processing technique to overcome some of the disadvantages of compression molding. The process involves inserting a golf ball core into a die, closing the die and forcing a heated, viscous polymeric material into the die. The material is then cooled and the golf ball is removed from the die. Injection molding is well-suited for thermoplastic materials, but has limited application to some thermosetting polymers. However, certain types of these thermosetting polymers often exhibit the hardness and elasticity desired for a golf ball cover. Some of the most promising thermosetting materials are reactive, requiring two or more components to be mixed and rapidly transferred into a die before a polymerization reaction is complete. As a result, traditional injection molding techniques do not provide proper processing when applied to these materials.

Reaction injection molding is a processing technique used specifically for certain reactive thermosetting plastics. As mentioned above, by "reactive" it is meant that the polymer is formed from two or more components that react. Generally, the components, prior to reacting, exhibit relatively low viscosities. The low viscosities of the components allow the use of lower temperatures and pressures than those utilized in traditional injection molding. In reaction injection molding, the two or more components are combined and reacted to produce the final polymerized material. Mixing of these separate components is critical, a distinct difference from traditional injection molding.

The process of reaction injection molding a golf ball cover involves placing a golf ball core into a die, closing the die, injecting the reactive components into a mixing chamber where they combine, and transferring the combined material into the die. The mixing begins the polymerization reaction, which is typically completed upon cooling of the cover material.

The present invention provides an improved golf ball and a new mold configuration for injection molding a golf ball cover or inner layer which promotes self-centering of the core or core and core or mantle layer(s), resulting in reduction of cosmetic defects and cover damage, enhanced properties and more efficient molding processes.

For certain applications it is desirable to produce a golf ball having a very thin cover layer. However, due to equipment limitations, it is often very difficult to mold a thin cover. Accordingly, it would be beneficial to provide an apparatus and technique for producing a relatively thin cover layer.

Moreover, retractable pins have been utilized to hold, or center, the core or core and mantle and/or cover layer(s) in place within a mold while molding an inner or outer cover layer thereon. In such processes, the core or mantled ball is supported in the mold using retractable pins extending from the inner surface of the mold to the outer surface of the core or mantled ball. The pins in essence support the core or mantled ball while the cover layer is injected into the mold. Subsequently, the pins are retracted as the cover material fills the void between the core or mantle and the inner surface of the mold.

However, notwithstanding, the benefits produced through the use of the retractable pins, the pins sometimes produce centering difficulties and cosmetic problems (i.e. pin flash, pin marks, etc.) during retraction, which in turn require additional handling to produce a golf ball suitable for use and sale. Additionally, the lower the viscosity of the mantle and/or cover materials, the greater the tendency for the retractable pins to stick due to material accumulation, making it necessary to shut down and clean the molds routinely. Accordingly, it would be desirable to provide golf ball and an apparatus forming a cover layer on a golf ball without the use of retractable pins.

BRIEF SUMMARY OF THE INVENTION

The present invention provides a solution to the need for pinless molding of a cover. The present invention provides a golf ball precursor product with a plurality of lobes extending from an innersphere. The lobes allow for the centering of the golf ball precursor product within a mold for forming a cover.

One aspect of the present invention is a method for forming a cover on a golf ball. The method begins with positioning a golf ball precursor product within a mold cavity, with the golf ball precursor product having a plurality of lobes extending outward from an innersphere of the golf ball precursor product. Next, a cover material is dispensed into the mold cavity to form a cover around the golf ball precursor product. Next, the cover material is flowed around each of the plurality of lobes to provide a cover with each of the plurality of lobes extending to an unfinished surface of the golf ball. Next, a coating is applied to the unfinished surface of the golf ball.

Another aspect of the present invention is a golf ball having a golf ball precursor product, a cover and a coating. The golf ball precursor product has a plurality of lobes, with each of the plurality of lobes extending outward from an innersphere of the golf ball precursor product. The cover covers a non-lobe area of the golf ball precursor product. The coating is disposed on the cover and a top of each of the plurality of lobes.

Yet another aspect of the present invention is an apparatus for forming a golf ball precursor product with a plurality of lobes. The apparatus includes a first mold half having a hemispheric surface comprising a smooth portion and a plurality of deep depressions and a second mold half having a hemispheric surface comprising a smooth portion and a plurality of deep depressions. The depth of each of the plurality of deep depressions of the first mold half and the second mold half ranges from 0.010 inch to 0.100 inch.

Yet another aspect of the present invention is a method for forming a golf ball precursor product with a plurality of lobes. The method begins with placing a spherical core or pre-core slug within a cavity of a mold assembly. The cavity is defined by a hemispheric surface of the first mold half and a hemispheric surface of a second mold half. The hemispheric surface of the first mold half includes a smooth portion and a plurality of deep depressions and the hemispheric surface of the second mold half includes a smooth portion and a plurality of deep depressions. Next, a golf ball precursor product is formed with a plurality of lobes from the spherical core or pre-core slug.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
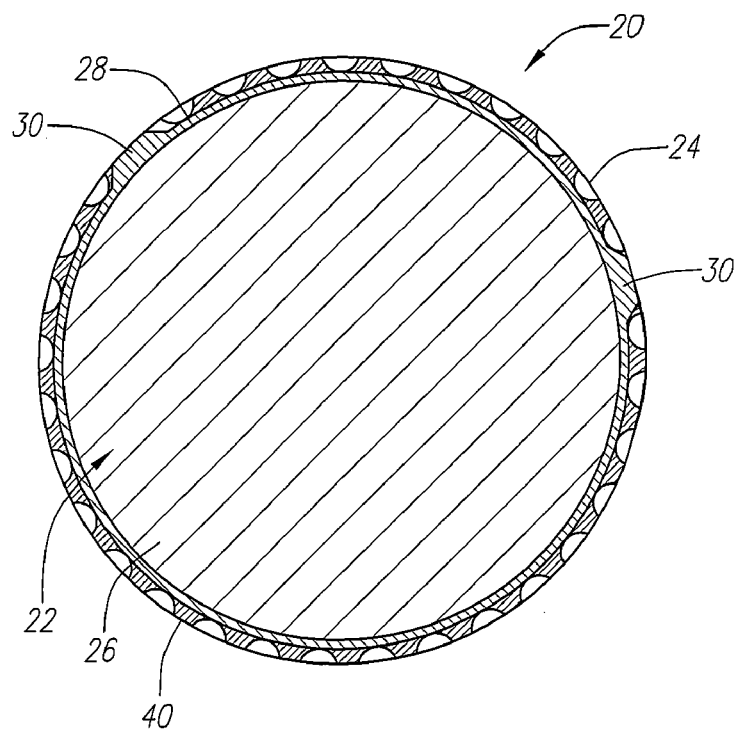
FIG. 1 is a cross-sectional view of a three-piece golf ball.
Figure 2:
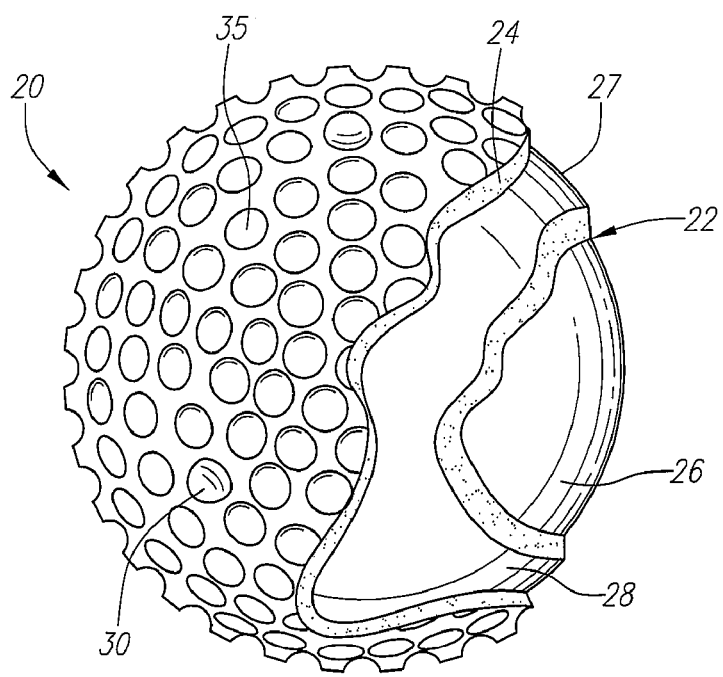
FIG. 2 is a partial cut-away view of a three-piece golf ball.
Figure 3:
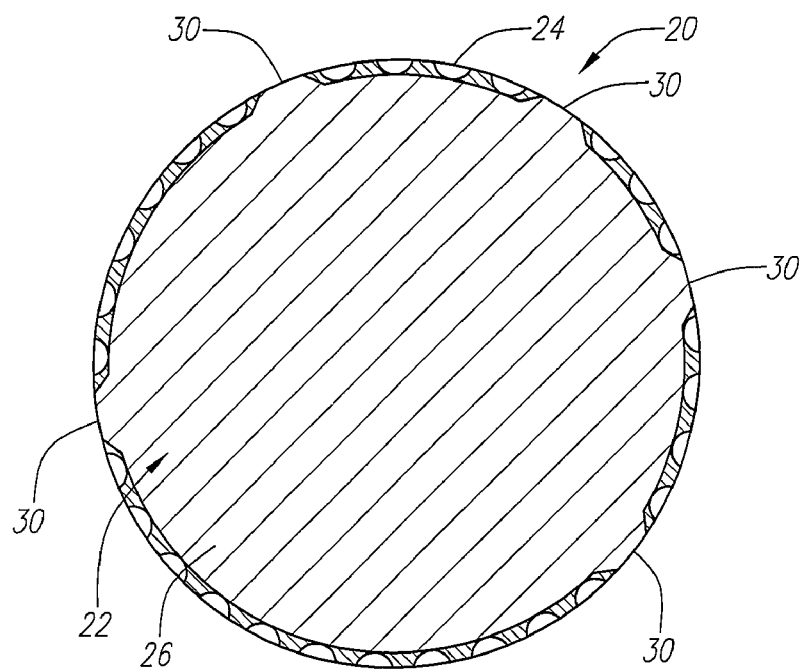
FIG. 3 is a cross-sectional view of a two-piece golf ball.
Figure 4:
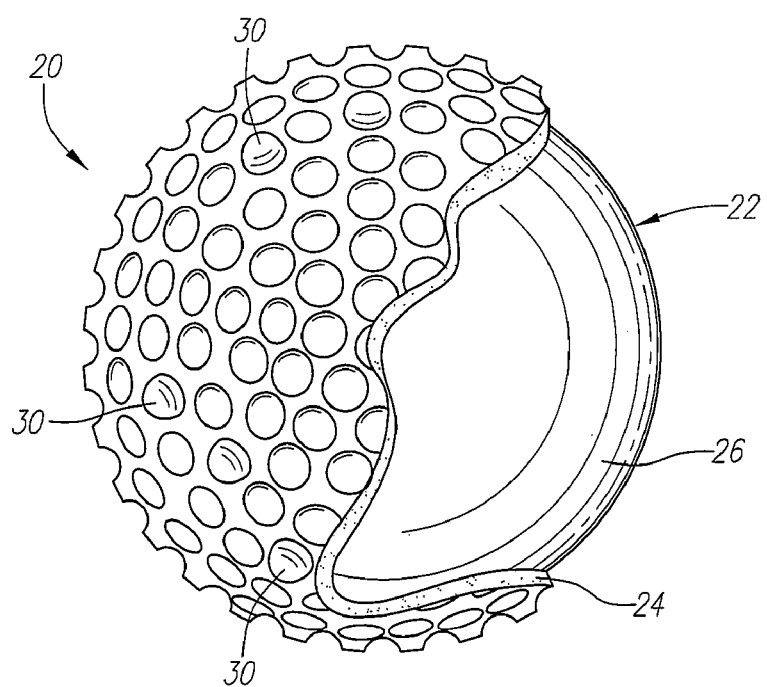
FIG. 4 is a partial cut-away view of a two-piece golf ball.

As shown in FIGS. 1-6, a golf ball is generally designated 20. The golf ball 20 includes a golf ball precursor product 22 and a cover 24. The golf ball precursor product 22 has a plurality of lobes 30 extending from an innersphere 27 of the golf ball precursor product 22. The golf ball precursor product 22 is preferably a core 26 and a mantle layer 28, as shown in FIGS. 1 and 2. Alternatively, the golf ball precursor product 22 is only a core 26, as shown in FIGS. 3 and 4. Still other embodiments may include multiple mantle layers and a multiple cores including solid, hollow and liquid-filled cores.

In a preferred embodiment, the golf ball precursor product 22 has six lobes 30 with three lobes 30 on each hemisphere 38a and 38b of the golf ball precursor product 22. In yet another embodiment, the golf ball precursor product 22 has twelve lobes 30 with six lobes 30 on each hemisphere 38a and 38b of the golf ball precursor product 22. In yet another embodiment, the golf ball precursor product 22 has two lobes 30 with a single lobe 30 on each hemisphere 38a and 38b of the golf ball precursor product 22. Those skilled in the pertinent art will recognize that the number of lobes 30 may vary form the above-mentioned embodiments without departing from the scope and spirit of the present invention.

The height, "$H_L$", of each of the lobes 30 preferably ranges from about 0.001 inch to about 0.090 inch, more preferably from about 0.001 inch to about 0.030 inch, and more preferably from about 0.001 inch to about 0.015 inch. Most preferably a total height of at least about 0.001 inch is desired for each lobe 30. More preferably, each of the plurality of lobes 30 has a height that is equal or approximately equal to the thickness of the cover 24. All of the plurality of lobes 30 preferably have the same shape. Alternatively, the shape of each of the plurality of lobes 30 may vary. Preferably each of the plurality of lobes 30 has a width, "$W_L$", as measured across a lobe 30 and shown in FIG. 6, ranging from about 0.05 inch to about 0.50 inch, more preferably from about 0.10 inch to about 0.30 inch, and even more preferably from about 0.14 inch to about 0.35 inch.

Figure 5:
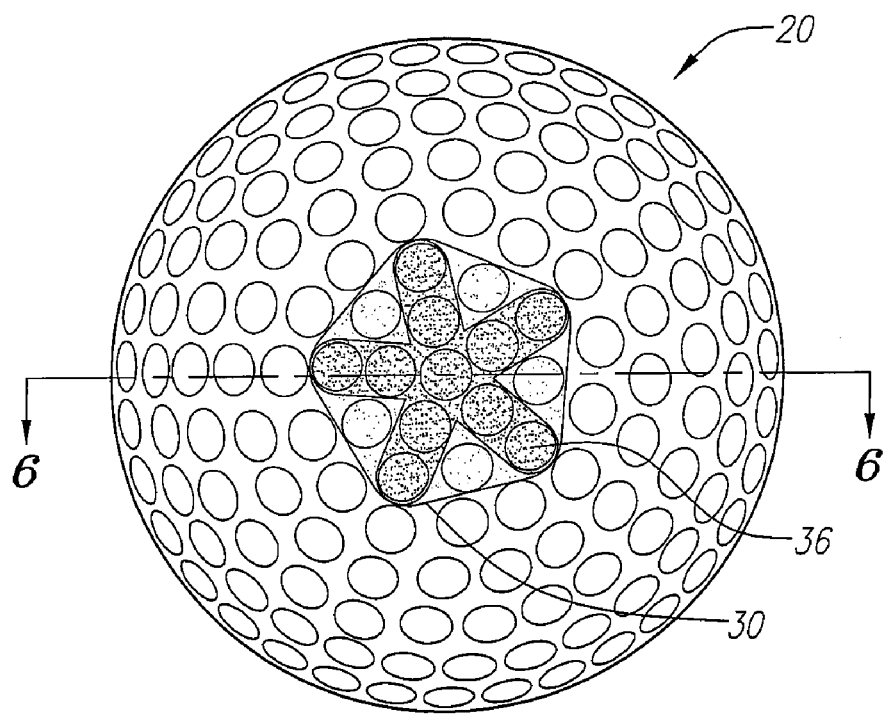
FIG. 5 is equatorial view of a golf ball.
Figure 6:
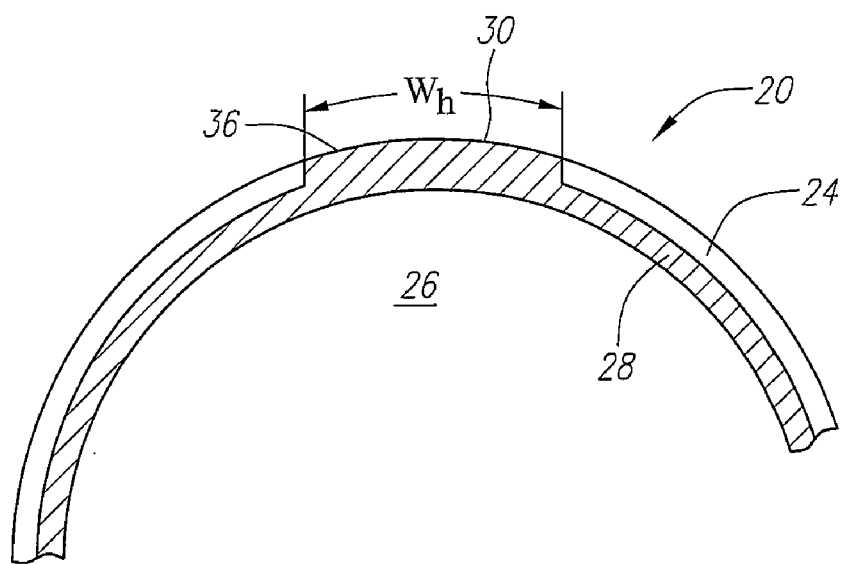
FIG. 6 is a cross-sectional view along line 6-6 of FIG. 5.

In a preferred embodiment, a top surface 36 of each of the plurality of lobes 30 extends to an unfinished surface 34 of the golf ball 20, as shown in FIG. 5. As explained in greater detail below in reference to manufacturing the golf ball 20, the plurality of lobes 30 preferably allow for "pinless" forming of the cover 24 over the non-lobe area 32 of the surface of the golf ball precursor product 22. More preferably, the plurality of lobes 30 allow for "pinless" injection molding, including reaction injection molding, of the cover 24 over the non-lobe area 32 of the surface of the golf ball precursor product 22. The plurality of lobes 30 preferably center the innersphere 27 of the golf ball precursor product 22 during the cover molding process to ensure core to cover concentricity.

Figure 7:
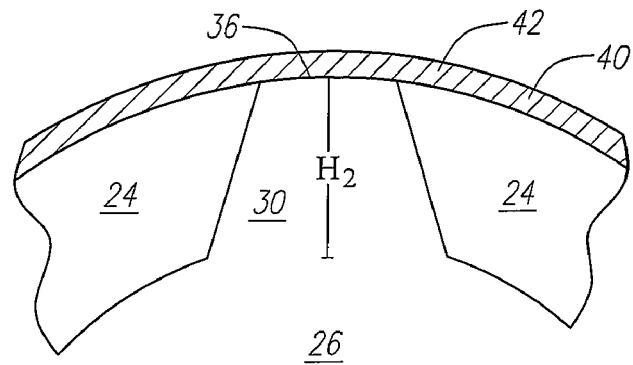
FIG. 7 is an isolated cross-sectional view of a lobe area of a golf ball having a top coat.
Figure 8:
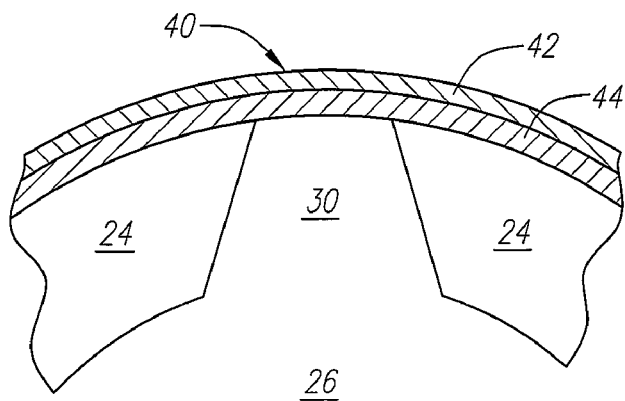
FIG. 8 is an isolated cross-sectional view of a lobe area of a golf ball having a top coat and a paint layer.
Figure 9:
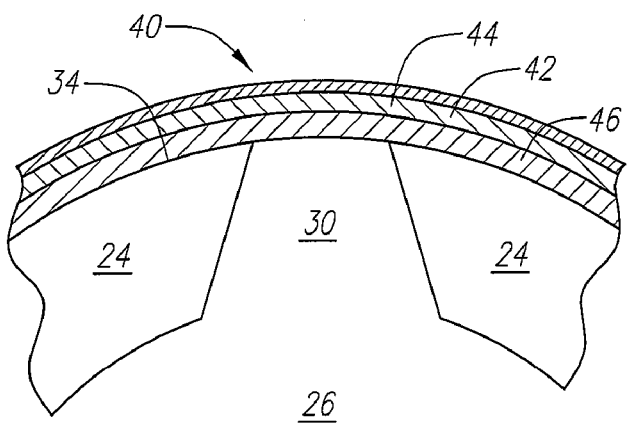
FIG. 9 is an isolated cross-sectional view of a lobe area of a golf ball having a top coat and two paint layers.
Figure 10:
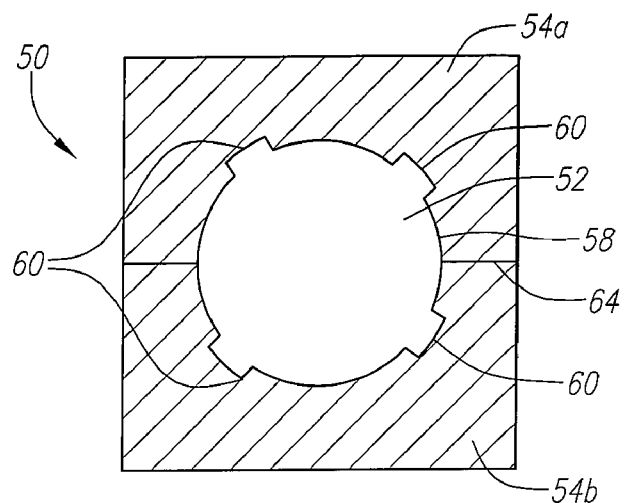
FIG. 10 is a cross-sectional view of a mold utilized in forming a golf ball precursor product.

As shown in FIGS. 7-9, the golf ball 20 is finished with a coating 40, which covers the top surface 36 of each of the plurality of lobes 30. In this manner, the top surface 36 of the each of the plurality of lobes 30 is "hidden" so that the golf ball 20 preferably has a uniform surface appearance. In one embodiment shown in FIG. 7, the coating 40 is a single top coat layer 42. In a second embodiment shown in FIG. 8, the coating 40 is a first paint layer 44 (preferably white paint) and a top coat layer 42. In a third embodiment shown in FIG. 9, the coating 40 is a first paint layer 44, a second paint layer 46 and a top coat layer 42. Those skilled in the pertinent art will recognize that the coating may vary in layers without departing from the scope and spirit of the present invention.

Figure 11:
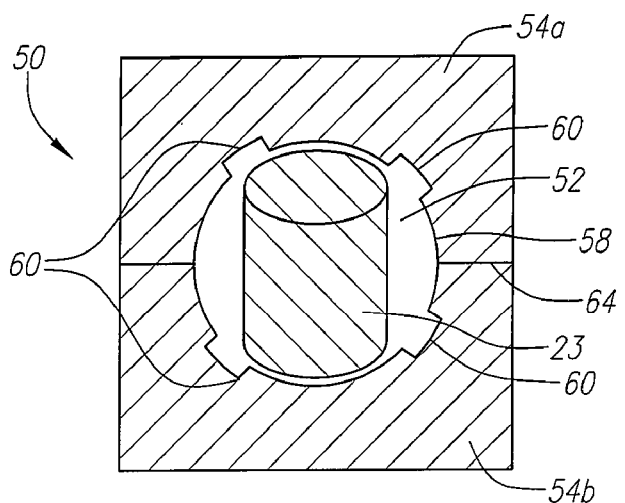
FIG. 11 is a cross-sectional view of a mold utilized in forming a golf ball precursor product with a pre-core slug therein.

FIGS. 10-14 illustrate an apparatus for forming the golf ball precursor product 22 with a plurality of lobes 30. A mold assembly is generally designated 50. The mold assembly 50 is preferably utilized in injection molding the mantle layer 28 on the core 26. Alternatively, the mold assembly 50 is utilized in injection molding the core 26. In yet another alternative embodiment, the mold assembly 50 is utilized in compression molding a pre-core slug 23, as shown in FIG. 11, into a core 26 with a plurality of lobes 30.

Figure 12:
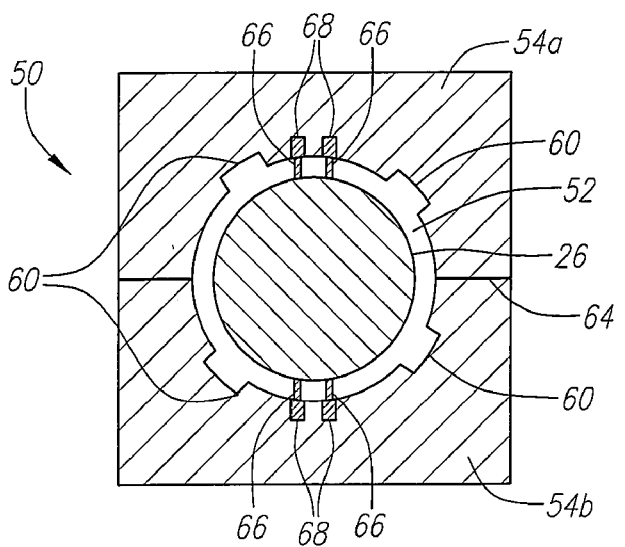
FIG. 12 is a cross-sectional view of a mold utilized in forming a golf ball precursor product with a core therein.
Figure 13:
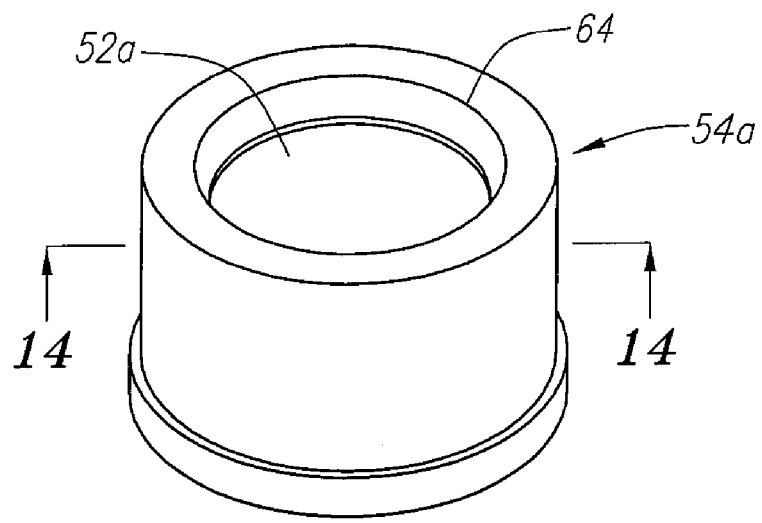
FIG. 13 is a top view of a mold half utilized in forming a golf ball precursor product.
Figure 14:
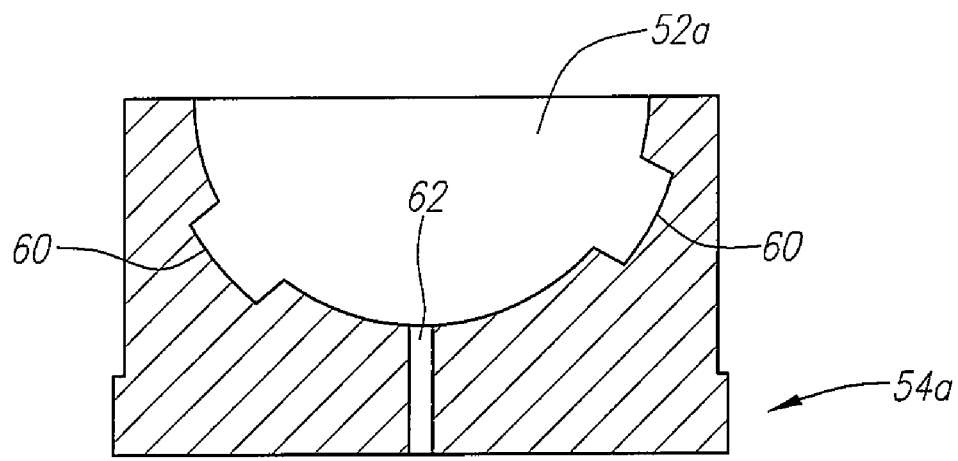
FIG. 14 is a cross-sectional view along line 14-14 of the mold half of FIG. 13.

In a preferred embodiment shown in FIG. 12, the mold assembly 50 includes a first mold 54a and a second mold half 54b. A cavity 52 is defined by a hemispheric surface 56a and 56b of each of the mold halves 54a and 54b. Each hemispheric surface 56a and 56b has a smooth portion 58 and a plurality of deep depressions 60. The plurality of deep depressions 60 forms the plurality of lobes 30. In a preferred embodiment, the mold assembly 50 has six depressions 60 with three depressions 60 in each hemispheric surface 56a and 56b. In yet another embodiment, the mold assembly 50 has twelve depressions 60 with six depressions 60 on each hemispheric surface 56a and 56b. In yet another embodiment, the mold assembly 50 has two depressions 60 with a single depression 60 on each hemispheric surface 56a and 56b. Those skilled in the pertinent art will recognize that the number of depressions 60 may vary form the above-mentioned embodiments without departing from the scope and spirit of the present invention.

A plurality of retractable pins 66 extend from a corresponding aperture 68 in each of the mold halves 54a and 54b. The retractable pins 66 preferably hold a core 26 within the cavity 52 during injection molding of the mantle layer 28 thereon. Use of such retractable pins is well-known in the relevant art. The retractable pins 66 are typically located near a pole 62 of a hemispheric surface 56a or 56b. Each of the plurality of deep depressions 60 in each of the hemispheric surfaces 56a and 56b is preferably located equidistant from each other within a first latitudinal region which preferably ranges from 10 degrees to 60 degrees longitude from an edge 64 of each respective hemispheric surface 56a or 56b.

The depth of each depression 60 preferably ranges from about 0.001 inch to about 0.100 inch, more preferably from about 0.001 inch to about 0.030 inch, and more preferably from about 0.001 inch to about 0.015 inch. A most preferred depth of each depression 60 is 0.010 inch. Those skilled in the pertinent art will recognize that the depth of each depression 60 may vary from each other depression 60 without departing from the scope and spirit of the present invention.

The golf ball precursor product 22 with a plurality of lobes 30 is preferably utilized in reaction injection molding ("RIM") a cover 24. The plurality of lobes 30 allow for the golf ball precursor product 22 to be centered during the formation of the cover 24 without the use of centering or retractable pins. Such pinless centering is important with RIM since the material solidifies quickly relative to other cover materials and can cause the pins to become jammed or blocked.

Figure 15:
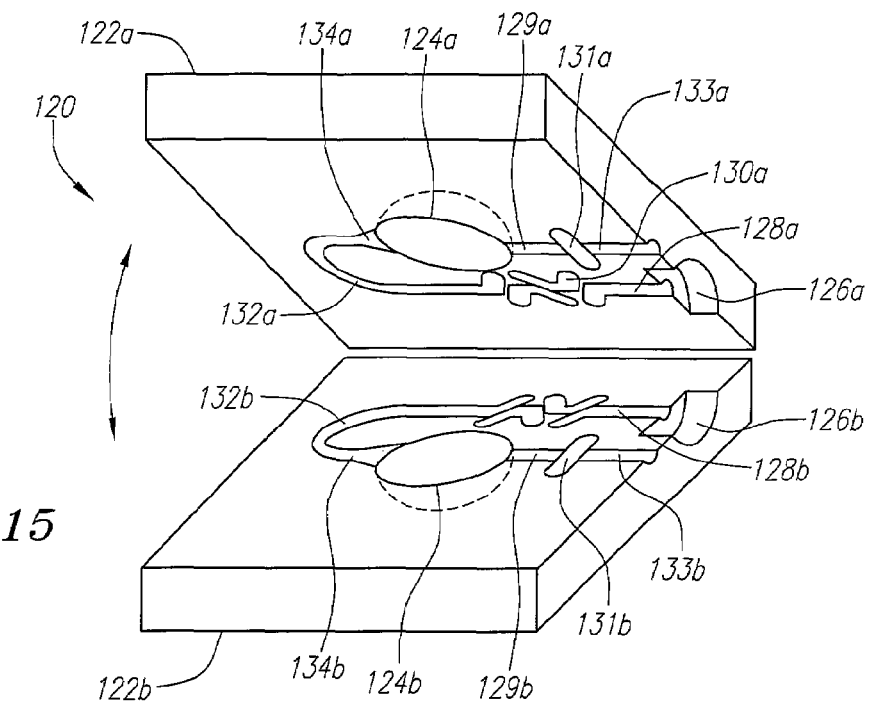
FIG. 15 is a view of a mold assembly utilized in forming a cover.
Figure 16:
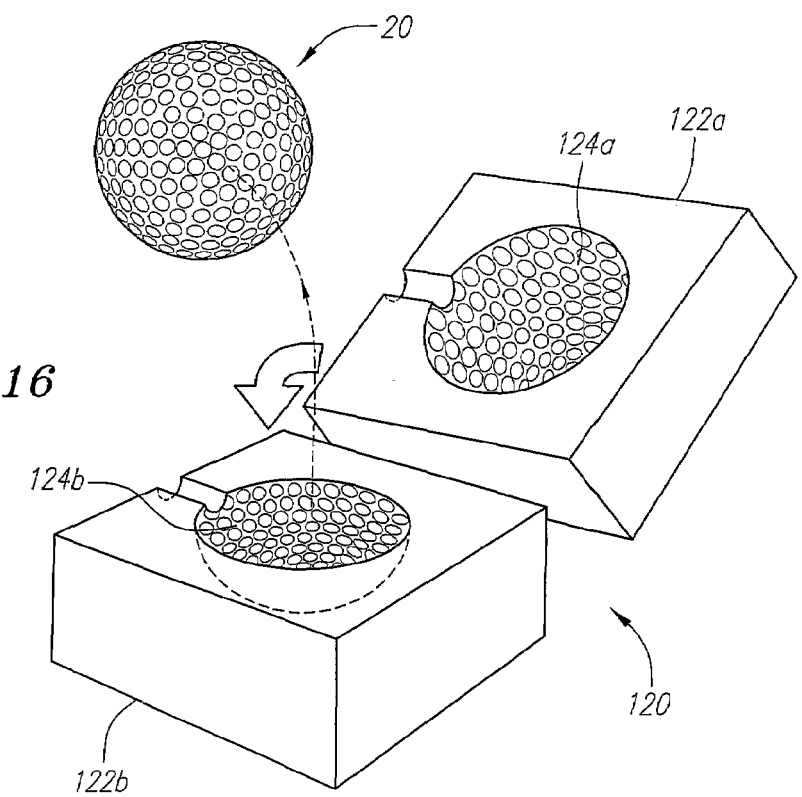
FIG. 16 is an isolated view of a portion of the mold assembly of FIG. 15 with a golf ball.
Figure 17:
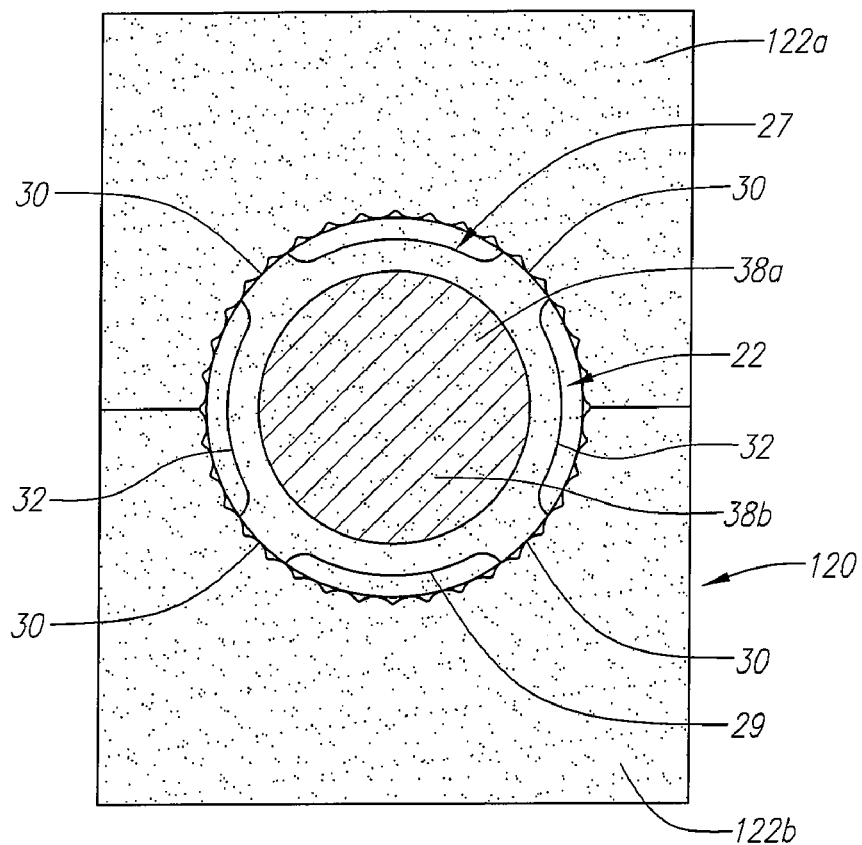
FIG. 17 is a cross-sectional view of a golf ball precursor product within a cavity of a mold assembly utilized in forming a cover.
Figure 18:
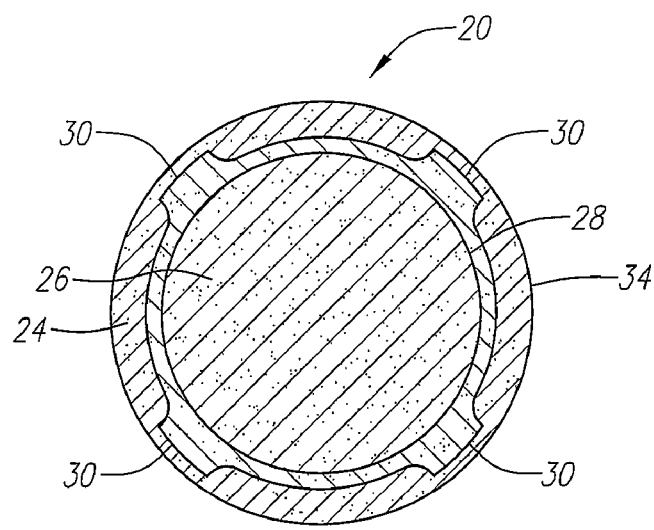
FIG. 18 is a cross-sectional view of a golf ball.

As shown in FIGS. 15-17, the preferred embodiment RIM molding assembly 1 20 provides mixing as a result of its unique design and configuration. An injection machine, as known in the art, is connected to the RIM molding assembly 120 which comprises an upper half 122A and a lower half 122B. As will be appreciated, the upper and lower halves 122A and 122B are preferably formed from a metal or suitable material. A mixing chamber may, as known in the art, precede the molding assembly 120 if desired. A golf ball precursor product 22 is positioned within a substantially spherical cavity formed from two hemispherical cavities 124A and 124B defined in opposing faces of the upper half and lower half 122A and 122B, respectively, of the molding assembly 120. As will be appreciated, when the upper and lower halves 122A and 122B are closed, and the cavities 124A and 124B are aligned with each other, the resulting cavity has a substantially spherical configuration. Each of the hemispherical cavities 124A and 124B defines a plurality of raised regions that, upon molding a cover layer therein, will result in an aerodynamic pattern on the cover 24. Such aerodynamic pattern may be a traditional dimple pattern or a pattern such as disclosed in U.S. Pat. No. 6,290,615 for a Golf Ball Having A Tubular Lattice Pattern.

Each upper and lower half 122A and 122B of the preferred embodiment molding assembly 120 defines an adapter portion 126A and 126B to enable the molding assembly 120 to connect to other process equipment as mentioned above and leads to a material inlet channel 128A and 128B. As will be understood, upon closing the upper and lower halves 122A and 122B of the molding assembly 120, the separate halves of adapter portion 126A and 126B are aligned with each other and create a material flow inlet within the molding assembly 120. Each upper and lower half 122A and 122B of the assembly 120 further defines flow channels 128A and 128B, 130A and 130B and 132A and 132B which create a comprehensive flow channel within the molding assembly 120 when the upper and lower halves 122A and 122B are closed. Specifically, the material flow inlet channel portion 128A, 128B receives the constituent materials from the adapter portion 126A and 126B and directs those materials to a turbulence-promoting portion of the channel 130A, 130B which is configured to form at least one fan gate. The upper and lower mold halves 122A and 122B include complimentary turbulence-promoting peanut after-mixer channel portions 130A and 130B, respectively. It will be appreciated that upon closing the upper and lower halves 122A and 122B of the molding assembly 120, the channel portion 130A and 130B defines a region of the flow channel that is generally nonlinear and includes a plurality of bends and at least one branching intersection generally referred to herein as an after-mixer gate. Each after-mixer channel portion 130A, 130B is designed to direct material flow along an angular or tortuous path. As will be described in more detail below, when material reaches a terminus of angular flow in one plane of the flow channel in one half, the material flows in a transverse manner to a corresponding after-mixer channel portion in the opposing half. Thus, when the constituent materials arrive at the after-mixer defined by the channel portion 130A and 130B, turbulent flow is promoted, forcing the materials to continue to mix within the molding assembly 120. This mixing within the molding assembly 120 provides for improved overall mixing of the constituent materials, thereby resulting in a more uniform and homogeneous composition for the cover 24.

The material inlet channel 128A and 128B allows entry of the constituents which are subsequently directed through the mix-promoting channel portion 130A and 130B, which forms the after-mixer, then through the connecting channel portion 132A and 132B and to the fan gate portion 134A and 134B which leads into the cavity 124A and 124B. The final channel portion 134A and 134B may be defined in several forms extending to the cavity 124A and 124B, including corresponding or complimentary paths which may be closed (134A) or open (134B) and of straight, curved or angular (134A, 134B) shape.

It has been discovered that because of the reduced process pressure involved in RIM, fewer supporting structures (the lobes 30) are necessary in the molding assembly 120 to centrally position the golf ball precursor product 22 in the central cavity 124A and 124B. Preferably, only three lobes 30 or less may be necessary per mold half. For some embodiments, it is preferred to utilize six lobes 30 per mold half. The use of lobes 30 reduces the cost of the tooling and reduces problems such as defacement and surface imperfections caused by retractable pins. A channel leading from the cavity 124A and 124B may be provided as either a cavity venting channel or an overflow channel or dump well as known in the art. A dump well 131a and 131B is provided in the corresponding molds. A dump well vent 133A, 133B provides communication between the dump well and mold exterior. A venting channel 129A, 129B is defined in the molds and provides communication between the central cavity 124A, 124B and the dump well 131A, 131B. It will be appreciated that when the upper and lower halves 122A and 122B are closed, the respective portions of the channel align with one another to form the venting or overflow channel.

In a preferred embodiment, the cover 24 is composed of a RIM polyurethane material. In an alternative embodiment, the golf ball 20 is constructed with a cover 24 composed of a polyurethane material as set forth in U.S. Pat. No. 6,117,024, for a Golf Ball With A Polyurethane Cover, which pertinent parts are hereby incorporated by reference. The golf ball 20 preferably has a coefficient of restitution at 143 feet per second greater than 0.7964, and an USGA initial velocity less than 255.0 feet per second. The golf ball 20 more preferably has a COR of approximately 0.8152 at 143 feet per second, and an initial velocity between 250 feet per second to 255 feet per second under USGA initial velocity conditions. A more thorough description of a high COR golf ball is disclosed in U.S. Pat. No. 6,443,858, which pertinent parts are hereby incorporated by reference.

Additionally, the core 26 of the golf ball 20 may be solid, hollow, or filled with a fluid, such as a gas or liquid, or have a metal mantle. The cover 24 of the golf ball 20 may be any suitable material. A preferred cover for a three-piece golf ball is composed of a thermoset polyurethane material. Alternatively, the cover 24 is composed of a thermoplastic polyurethane, ionomer blend, ionomer rubber blend, ionomer and thermoplastic polyurethane blend, or like materials. Those skilled in the pertinent art will recognize that other cover materials may be utilized without departing from the scope and spirit of the present invention. The golf ball 20 may have a finish of one or two basecoats and/or one or two top coats.

In an alternative embodiment of a golf ball 20, the mantle layer 28 or cover layer 24 is comprised of a high acid (i.e. greater than 16 weight percent acid) ionomer resin or high acid ionomer blend. More preferably, the mantle layer 28 is comprised of a blend of two or more high acid (i.e. greater than 16 weight percent acid) ionomer resins neutralized to various extents by different metal cations.

In an alternative embodiment of a golf ball 20, the mantle layer 28 or cover layer 24 is comprised of a low acid (i.e. 16 weight percent acid or less) ionomer resin or low acid ionomer blend. Preferably, the mantle layer 28 is comprised of a blend of two or more low acid (i.e. 16 weight percent acid or less) ionomer resins neutralized to various extents by different metal cations. The mantle layer 28 compositions of the embodiments described herein may include the high acid ionomers such as those developed by E. I. DuPont de Nemours & Company under the SURLYN brand, and by Exxon Corporation under the ESCOR or IOTEK brands, or blends thereof. Examples of compositions which may be used as the mantle layer 28 herein are set forth in detail in U.S. Pat. No. 5,688,869, which is incorporated herein by reference. Of course, the mantle layer 28 high acid ionomer compositions are not limited in any way to those compositions set forth in said patent. Those compositions are incorporated herein by way of examples only.

The high acid ionomers which may be suitable for use in formulating the mantle layer 28 compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10-100%, preferably 30-70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 993, and 994. In this regard, ESCOR or IOTEK 959 is a sodium ion neutralized ethylene-acrylic neutralized ethylene-acrylic acid copolymer. According to Exxon, IOTEKS 959 and 960 contain from about 19.0 to about 21.0% by weight acrylic acid with approximately 30 to about 70 percent of the acid groups neutralized with sodium and zinc ions, respectively.

Furthermore, as a result of the previous development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are also available for golf ball cover production. It has been found that these additional cation neutralized high acid ionomer blends produce mantle layer 28 compositions exhibiting enhanced hardness and resilience due to synergies which occur during processing. Consequently, these metal cation neutralized high acid ionomer resins can be blended to produce substantially higher C.O.R.'s than those produced by the low acid ionomer mantle layer 28 compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the mantle layer 28 of the golf ball of the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The mantle layer 28 compositions may include the low acid ionomers such as those developed and sold by E. 1. DuPont de Nemours & Company under the SURLYN and by Exxon Corporation under the brands ESCOR and IOTEK, ionomers made in-situ, or blends thereof.

Another embodiment of the mantle layer 28 comprises a non-ionomeric thermoplastic material or thermoset material. Suitable non-ionomeric materials include, but are not limited to, metallocene catalyzed polyolefins or polyamides, polyamide/ionomer blends, polyphenylene ether/ionomer blends, etc., which preferably have a Shore D hardness of at least 60 (or a Shore C hardness of at least about 90) and a flex modulus of greater than about 30,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the brand HYTREL, or thermoplastic block polyamides, for example, a polyether amide such as that marketed by Elf Atochem S. A. under the brand PEBEX, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

Additional materials suitable for use in the mantle layer 28 or cover layer 24 of the present invention include polyurethanes. These are described in more detail below.

In one embodiment, the cover layer 24 is comprised of a relatively soft, low flex modulus (about 500 psi to about 50,000 psi, preferably about 1,000 psi to about 25,000 psi, and more preferably about 5,000 psi to about 20,000 psi) material or blend of materials. Preferably, the cover layer 24 comprises a polyurethane, a polyurea, a blend of two or more polyurethanes/polyureas, or a blend of one or more ionomers or one or more non-ionomeric thermoplastic materials with a polyurethane/polyurea, preferably a thermoplastic polyurethane or reaction injection molded polyurethane/polyurea (described in more detail below).

The cover layer 24 preferably has a thickness in the range of 0.005 inch to about 0.15 inch, more preferably about 0.010 inch to about 0.050 inch, and most preferably 0.015 inch to 0.025 inch. In one embodiment, the cover layer 24 has a Shore D hardness of 60 or less (or less than 90 Shore C), and more preferably 55 or less (or about 80 Shore C or less). In another preferred embodiment, the cover layer 24 is comparatively harder than the mantle layer 28.

In one preferred embodiment, the cover layer 24 comprises a polyurethane, a polyurea or a blend of polyurethanes/polyureas. Polyurethanes are polymers which are used to form a broad range of products. They are generally formed by mixing two primary ingredients during processing. For the most commonly used polyurethanes, the two primary ingredients are a polyisocyanate (for example, 4,4'-diphenylmethane diisocyanate monomer ("MDI") and toluene diisocyanate ("TDI") and their derivatives) and a polyol (for example, a polyester polyol or a polyether polyol).

A wide range of combinations of polyisocyanates and polyols, as well as other ingredients, are available. Furthermore, the end-use properties of polyurethanes can be controlled by the type of polyurethane utilized, such as whether the material is thermoset (cross linked molecular structure not flowable with heat) or thermoplastic (linear molecular structure flowable with heat).

Cross linking occurs between the isocyanate groups (——NCO) and the polyol's hydroxyl end-groups (——OH). Cross linking will also occur between the $NH_2$ group of the amines and the NCO groups of the isocyanates, forming a polyurea. Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems ("RIM")) or may be on the order of several hours or longer (as in several coating systems such as a cast system). Consequently, a great variety of polyurethanes are suitable for different end-uses.

Polyurethanes are typically classified as thermosetting or thermoplastic. A polyurethane becomes irreversibly "set" when a polyurethane prepolymer is cross linked with a polyfunctional curing agent, such as a polyamine or a polyol. The prepolymer typically is made from polyether or polyester. A prepolymer is typically an isocyanate terminated polymer that is produced by reacting an isocyanate with a moiety that has active hydrogen groups, such as a polyester and/or polyether polyol. The reactive moiety is a hydroxyl group. Diisocyanate polyethers are preferred because of their water resistance.

The physical properties of thermoset polyurethanes are controlled substantially by the degree of cross linking and by the hard and soft segment content. Tightly cross linked polyurethanes are fairly rigid and strong. A lower amount of cross linking results in materials that are flexible and resilient. Thermoplastic polyurethanes have some cross linking, but primarily by physical means, such as hydrogen bonding. The crosslinking bonds can be reversibly broken by increasing temperature, such as during molding or extrusion. In this regard, thermoplastic polyurethanes can be injection molded, and extruded as sheet and blow film. They can be used up to about 400 degrees Fahrenheit, and are available in a wide range of hardnesses.

Polyurethane materials suitable for the present invention may be formed by the reaction of a polyisocyanate, a polyol, and optionally one or more chain extenders. The polyol component includes any suitable polyether- or polyester polyol. Additionally, in an alternative embodiment, the polyol component is polybutadiene diol. The chain extenders include, but are not limited to, diols, triols and amine extenders. Any suitable polyisocyanate may be used to form a polyurethane according to the present invention. The polyisocyanate is preferably selected from the group of diisocyanates including, but not limited to, 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5,-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI").

Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis (isocyanato methyl) cyclohexane; and polymethylene polyphenyl isocyanate ("PMDI").

One additional polyurethane component which can be used in the present invention incorporates TMXDI ("META") aliphatic isocyanate (Cytec Industries, West Paterson, N.J.). Polyurethanes based on meta-tetramethylxylylene diisocyanate (TMXDI) can provide improved gloss retention UV light stability, thermal stability, and hydrolytic stability. Additionally, TMXDI ("META") aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

The cover layer 24 preferably comprises a polyurethane with a Shore D hardness (plaque) of from about 10 to about 55 (Shore C of about 15 to about 75), more preferably from about 25 to about 55 (Shore C of about 40 to about 75), and most preferably from about 30 to about 55 (Shore C of about 45 to about 75) for a soft cover layer 24 and from about 20 to about 90, preferably about 30 to about 80, and more preferably about 40 to about 70 for a hard cover layer 14.

The polyurethane preferably has a flex modulus from about 1 to about 310 Kpsi, more preferably from about 3 to about 100 Kpsi, and most preferably from about 3 to about 40 Kpsi for a soft cover layer 14 and 40 to 90 Kpsi for a hard cover layer 24.

Non-limiting examples of a polyurethane suitable for use in mantle layer 28 include a thermoplastic polyester polyurethane such as Bayer Corporation's TEXIN polyester polyurethane (such as TEXIN DP7-1097 and TEXIN 285 grades) and a polyester polyurethane such as B. F. Goodrich Company's ESTANE polyester polyurethane (such as ESTANE X-4517 grade). The thermoplastic polyurethane material may be blended with a soft ionomer or other non-ionomer. For example, polyamides blend well with soft ionomer.

Other soft, relatively low modulus non-ionomeric thermoplastic or thermoset polyurethanes may also be utilized, as long as the non-ionomeric materials produce the playability and durability characteristics desired without adversely affecting the enhanced travel distance characteristic produced by the high acid ionomer resin composition. These include, but are not limited to thermoplastic polyurethanes such as the PELLETHANE thermoplastic polyurethanes from Dow Chemical Co.; and non-ionomeric thermoset polyurethanes including but not limited to those disclosed in U.S. Pat. No. 5,334,673 incorporated herein by reference.

Typically, there are two classes of thermoplastic polyurethane materials: aliphatic polyurethanes and aromatic polyurethanes. The aliphatic materials are produced from a polyol or polyols and aliphatic isocyanates, such as $H_{12}$MDI or HDI, and the aromatic materials are produced from a polyol or polyols and aromatic isocyanates, such as MDI or TDI. The thermoplastic polyurethanes may also be produced from a blend of both aliphatic and aromatic materials, such as a blend of HDI and TDI with a polyol or polyols.

Generally, the aliphatic thermoplastic polyurethanes are lightfast, meaning that they do not yellow appreciably upon exposure to ultraviolet light. Conversely, aromatic thermoplastic polyurethanes tend to yellow upon exposure to ultraviolet light. One method of stopping the yellowing of the aromatic materials is to paint the outer surface of the finished ball with a coating containing a pigment, such as titanium dioxide, so that the ultraviolet light is prevented from reaching the surface of the ball. Another method is to add UV absorbers, optical brighteners and stabilizers to the clear coating(s) on the outer cover, as well as to the thermoplastic polyurethane material itself. By adding UV absorbers and stabilizers to the thermoplastic polyurethane and the coating(s), aromatic polyurethanes can be effectively used in the outer cover layer of golf balls. This is advantageous because aromatic polyurethanes typically have better scuff resistance characteristics than aliphatic polyurethanes, and the aromatic polyurethanes typically cost less than the aliphatic polyurethanes.

Other suitable polyurethane materials for use in the present invention golf balls include reaction injection molded ("RIM") polyurethanes. RIM is a process by which highly reactive liquids are injected into a mold, mixed usually by impingement and/or mechanical mixing in an in-line device such as a "peanut mixer," where they polymerize primarily in the mold to form a coherent, one-piece molded article. The RIM process usually involves a rapid reaction between one or more reactive components such as a polyether polyol or polyester polyol, polyamine, or other material with an active hydrogen, and one or more isocyanate-containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, for example, 1,500 to 3,000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM. Further descriptions of suitable RIM systems is disclosed in U.S. Pat. No. 6,663,508, which pertinent parts are hereby incorporated by reference.

Non-limiting examples of suitable RIM systems for use in the present invention are BAYFLEX elastomeric polyurethane RIM systems, BAYDUR GS solid polyurethane RIM systems, PRISM solid polyurethane RIM systems, all from Bayer Corp. (Pittsburgh, Pa.), SPECTRIM reaction moldable polyurethane and polyurea systems from Dow Chemical USA (Midland, Mich.), including SPECTRIM MM 373-A (isocyanate) and 373-B (polyol), and ELASTOLIT SR systems from BASF (Parsippany, N.J.). Preferred RIM systems include BAYFLEX MP-10000, BAYFLEX MP-7500 and BAYFLEX 110-50, filled and unfilled. Further preferred examples are polyols, polyamines and isocyanates formed by processes for recycling polyurethanes and polyureas. Additionally, these various systems may be modified by incorporating a butadiene component in the diol agent.

Another preferred embodiment is a golf ball in which at least one of the boundary layer 28 and/or the cover layer 24 comprises a fast-chemical-reaction-produced component. This component comprises at least one material selected from the group consisting of polyurethane, polyurea, polyurethane ionomer, epoxy, and unsaturated polyesters, and preferably comprises polyurethane, polyurea or a blend comprising polyurethanes and/or polymers. A particularly preferred form of the invention is a golf ball with a cover comprising polyurethane or a polyurethane blend.

The polyol component typically contains additives, such as stabilizers, flow modifiers, catalysts, combustion modifiers, blowing agents, fillers, pigments, optical brighteners, and release agents to modify physical characteristics of the cover. Polyurethane/polyurea constituent molecules that were derived from recycled polyurethane can be added in the polyol component.

The surface geometry of the golf ball 20 is preferably a conventional dimple pattern such as disclosed in U.S. Pat. No. 6,213,898 for a Golf Ball With An Aerodynamic Surface On A Polyurethane Cover, which pertinent parts are hereby incorporated by reference. Alternatively, the surface geometry of the golf ball 20 may have a non-dimple pattern such as disclosed in U.S. Pat. No. 6,290,615 for A Golf Ball Having Tubular Lattice Pattern, which pertinent parts are hereby incorporated by reference.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A method for forming a cover on a golf ball, the method comprising:
positioning a golf ball precursor product within a mold cavity, the golf ball precursor product having a plurality of lobes extending outward from an innersphere of the golf ball precursor product;
dispensing a cover material into the mold cavity to form a cover around the golf ball precursor product;
flowing the cover material around each of the plurality of lobes to provide a cover with each of the plurality of lobes extending to an unfinished surface of the golf ball; and
applying a coating to the unfinished surface of the golf ball.

2. The method according to claim 1 wherein the golf ball precursor product is a core and mantle layer, the plurality of lobes extend from a surface of the mantle layer.

3. The method according to claim 1 wherein the golf ball precursor product is a core and the plurality of lobes extend from a surface of the core.

4. The method according to claim 1 wherein each of the plurality of lobes has a height ranging from 0.005 inch to 0.100 inch and the innersphere of golf ball precursor product has a diameter ranging from 1.45 inches to 1.69 inches.

5. The method according to claim 1 wherein the plurality of lobes comprises a first lobe positioned on a first hemisphere of the golf ball precursor product and a second lobe positioned on a second hemisphere of the golf ball precursor product.

6. The method according to claim 1 wherein the plurality of lobes comprises a first group of three lobes positioned on a first hemisphere of the golf ball precursor product and a second group of three lobes positioned on a second hemisphere of the golf ball precursor product.

7. The method according to claim 1 wherein dispensing a cover material into the mold cavity comprises reaction injecting a material into the mold cavity, the material comprising a reaction mixture of a polyol reactant and a isocyanate reactant.

8. The method according to claim 1 wherein dispensing a cover material into the mold cavity comprises injecting a thermoplastic material into the mold cavity.

9. The method according to claim 1 wherein the coating is a paint.

10. A golf ball comprising:
a golf ball precursor product having a plurality of lobes, each of the plurality of lobes extending outward from an innersphere of the golf ball precursor product;
a cover, the cover covering a non-lobe area of the golf ball precursor product;
a coating disposed on the cover and a top of each of the plurality of lobes.

11. The golf ball according to claim 10 wherein the golf ball precursor product comprises a core and a mantle, each of the plurality of lobes extending from a surface of the mantle layer.

12. The golf ball according to claim 10 wherein the coating comprises a paint layer and a top coat layer.

13. The golf ball according to claim 10 wherein the coating comprises a first paint layer, a second paint layer and a top coat layer.

14. The golf ball according to claim 10 wherein the coating comprises a top coat layer.

15. The golf ball according to claim 10 wherein the golf ball precursor product comprises a core, each of the plurality of lobes extending from a surface of the core.

16. The golf ball according to claim 10 wherein each of the plurality of lobes has a height ranging from 0.010 inch to 0.100 inch and the innersphere of golf ball precursor product has a diameter ranging from 1.45 inches to 1.69 inches.

17. The golf ball according to claim 10 wherein the plurality of lobes comprises a first lobe positioned on a first hemisphere of the golf ball precursor product and a second lobe positioned on a second hemisphere of the golf ball precursor product.

18. The golf ball according to claim 10 wherein the plurality of lobes comprises a first group of three lobes positioned on a first hemisphere of the golf ball precursor product and a second group of three lobes positioned on a second hemisphere of the golf ball precursor product.

19. The golf ball according to claim 10 wherein the plurality of lobes cover 5% to 25% of the surface area of the innersphere of the golf ball precursor product.

* * * * *